TELEVISION BRIGHTNESS AND CONTRAST CONTROL CIRCUIT

Original Filed March 27, 1959 2 Sheets-Sheet 1

INVENTORS
RICHARD W. AHRONS, &
BY LESLIE L. BURNS, JR.
W. H. Sprague
ATTORNEY

April 20, 1965 R. W. AHRONS ETAL 3,179,743

TELEVISION BRIGHTNESS AND CONTRAST CONTROL CIRCUIT

Original Filed March 27, 1959 2 Sheets-Sheet 2

INVENTORS
RICHARD W. AHRONS &
BY LESLIE L. BURNS, JR

W. H. Sprague
ATTORNEY

United States Patent Office 3,179,743

Patented Apr. 20, 1965

3,179,743

TELEVISION BRIGHTNESS AND CONTRAST CONTROL CIRCUIT

Richard W. Ahrons, Somerville, and Leslie L. Burns, Jr., Princeton, N.J., assignors to Radio Corporation of America, a corporation of Delaware Original application Mar. 27, 1959, Ser. No. 802,386, now Patent No. 3,072,741, dated Jan. 8, 1963. Divided and this application May 15, 1962, Ser. No. 194,827

7 Claims. (Cl. 178—5.4)

This invention relates to an automatic system for controlling the brightness and contrast of the image reproduced by a television image reproducing device.

This application is a division of an application Serial No. 802,386, filed March 27, 1959, now Patent No. 3,072,741, issued January 8, 1963 for Richard W. Ahrons and Leslie L. Burns, Jr., entitled "Television Brightness and Contrast Control Circuit," and assigned to the same assignee as this application.

In order to make the description of the invention that follows clear, it should be kept in mind that by contrast control is meant the control, generally on a television receiver or monitor, that principally controls the amount of peak-to-peak video signal applied to the image reproducing device. Similarly, the brightness control operates to vary the amount of direct current (D.C.) voltage in the signal that is applied to the image reproducing device. Because the low level or dark portions of the picture are particularly sensitive to the absolute level at which they occur, the brightness control is often referred to as a background control.

Brightness and contrast controls are generally included on a television receiver, for example, primarily to enable the viewer to correct for program and station differences as well as aging of the receiver components. Program differences, created for example by very poor gray scale rendition (resulting when old movies are being viewed), may be corrected to some extent by variation of the brightness and contrast settings of a television receiver. Since some television transmitting stations operate with more "set up," some adjustment of the brightness control on the usual television receiver is often required to obtain a suitable background of the reproduced image. Also, some stations tend to modulate at a higher level than others which requires a suitable adjustment of the contrast control.

Although brightness and contrast controls are useful, the average viewer does not understand these controls well enough to be able to obtain an optimum picture except by a process of trial and error. Both the contrast and brightness controls interact with each other to the extent that each affects the operation of the other. This interaction of the controls is considered desirable by some engineers but on the other hand may so confuse the viewer that he may not consistently obtain optimum performance from the television receiver.

It has been found that on the average, if the viewer is not allowed to adjust any of the controls, a more satisfactory picture can be obtained. The reason for this statement may be illustrated by a simple example. Suppose the viewer turns up the contrast to compensate for low modulation. Next, suppose he later changes to a station that modulates fully and observes that the blacks are too dark and then turns up the brightness control. Under these conditions, if the scene next changes to one with high overall brightness, the receiver high voltage power supply could immediately overload and cause defocussing, blooming or, if the television receiver is a color set, turn the entire picture to green.

Accordingly, it is an object of this invention to provide a novel and improved cathode ray tube automatic contrast and brightness control system.

Current practice in color television receivers and color monitors using shadow-mask color kinescopes requires operating the kinescope at or near its maximum ratings for high voltage power input. In order to provide good regulation, the high voltage supply should be capable of providing considerably more than the safe power input to the kinescope. A monitor or receiver operating this way can be overloaded and possibly damaged by the simple condition of applying excessive level of video signal to the kinescope.

In a typical high voltage supply for a color kinescope, high voltage flyback pulses, derived from the horizontal deflection output transformer, are applied to the input electrode of a rectifier. The rectifier delivers a charging current to a capacitor (which may be part of the kinescope) connected between the output electrode of the rectifier and a point of reference potential in response to the rectification of the flyback pulses. The D.C. voltage developed across the charging capacitor is applied to the kinescope ultor electrode. Since the effective loading on the ultor supply will necessarily vary with picture content, i.e. with beam current, D.C. regulation is generally required. Suitable voltage regulation is achieved by shunting the space discharge path of a regulator tube across the rectifier output circuit. However, such regulator requires an additional tube that is usually relatively expensive and does nothing toward simplifying the brightness and contrast controls in the receiver.

Hence another object of the invention is to provide a novel and improved circuit for maintaining constant the average cathode ray beam current in a cathode ray tube.

A further object of the invention is to provide a novel and improved circuit for automatically controlling the brightness and contrast of the picture produced by a television reproducing system.

An additional object of the present invention is to provide an improved system that prevents spot blooming in a color television receiver.

Still another object of this invention is to provide a novel system that prevents ultor power supply overload in a color television receiver whereby the need for a shunt regulator tube in the high voltage power supply is eliminated.

An additional object of this invention is to provide a novel automatic brightness and contrast control circuit for a television signal reproducing device which circuit is insensitive to the aging of the television reproducing device and the control circuit itself.

In accordance with one form of the invention, two feedback loops are employed in a television receiver; one to maintain the average current in the kinescope (image reproducing device) constant; the other to prevent the white peaks of the video signal driving the kinescope from exceeding the level at which spot blooming occurs.

As noted above, it is normally desirable to operate a color television reproducing device under conditions of maximum contrast and brightness. That is, the contrast control is normally adjusted to the point just below where spot blooming becomes objectionable. Also, the brightness control is normally adjusted to the point where the kinescope ultor power supply does not overload for the particular station and material being viewed. The two feedback loops of the invention provide circuitry for automatically maintaining these maximums.

A more detailed description follows, in conjunction with the accompanying drawings, in which like reference numerals refer to like parts, in which.

Figure 1:
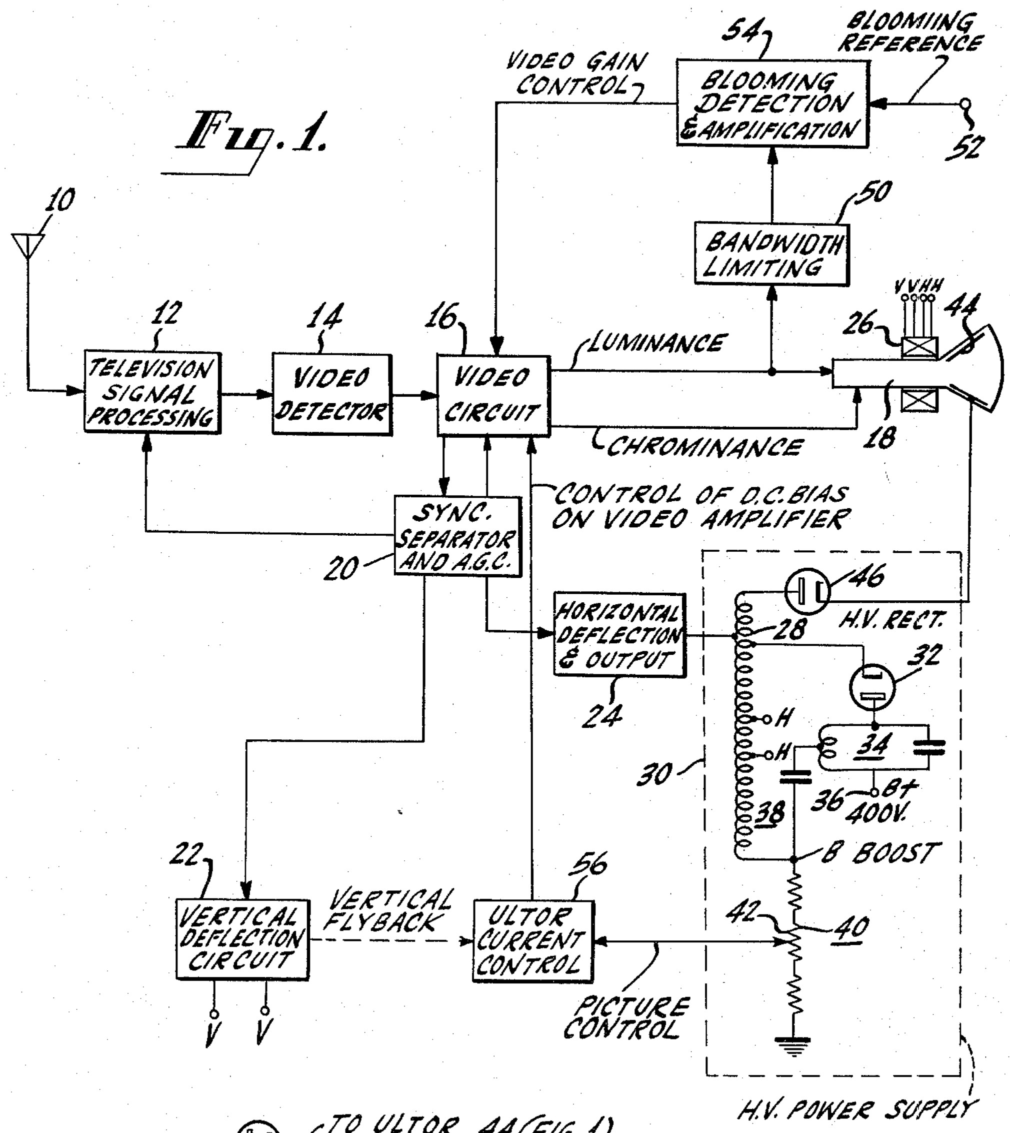
FIGURE 1 is a partial block diagram of a typical color television receiver wherein the average kinescope current is maintained constant and the peak whites of the video signal are held just below blooming level.

FIGURE 1 shows, by way of illustration only, a typical television receiver which may for example be similar to that described in "Practical Color Television for the Service Industry," published by RCA Service Company Incorporated, Camden, New Jersey, second edition, April 1954. In the alternative, the receiver may be the same as that of the CTC7 chassis, the circuits and service data for which are available from RCA Service Company, Camden 8, New Jersey. While the specific form of the signal processing apparatus does not constitute a part of the invention, the showing of a suitable receiver is made to fully and clearly set forth the environment in which the invention may operate. The ground symbol has been omitted in the several blocks for the sake of clarity but may be assumed at present where needed to complete a circuit.

In FIGURE 1, a transmitted color television signal, received by an antenna 10, is applied to the input terminals of a television signal processing section 12 of the receiver. This signal processing section 12 may include the usual radio frequency, mixer, and intermediate frequency stages of a typical television receiver. In the alternative, the television receiver signal processing section 12 may be considered as the input of a composite color television signal from a suitable studio signal source. In this case, the remainder of the circuitry in FIGURE 1 would then be termed a color television monitor. The invention as will be described below has equal utility with either a receiver or a monitor, monochrome or color.

The output of the television signal processing section 12 is passed to a video detector 14 which detects the intermediate frequency signal from the processing section 12 to provide a composite black and white or color television signal as the case may be. In the instance of a color television receiver, as has been assumed, the composite color television signal from the video detector 14 is passed to the video circuits 16 which may include a luminance channel and a chrominance channel. In the chrominance channel, the chrominance signal portion of the composite signal is demodulated and matrixed to form the several red, green and blue color difference signals which are then applied to the respective guns of an image reproducing device or color kinescope 18.

The video circuit 16 also amplifies the luminance and synchronizing pulses of the composite color television signal. The luminance signal, thus processed, is then applied to the red, green and blue guns of the color kinescope 18. The synchronizing components are passed from the video circuits 16 through a synchronizing signal (sync) separator and automatic gain control (AGC) circuit 20 which operates both to automatically control the gain of the television signal processing section 12 in a well known manner and also drive the vertical deflection circuits 22. In addition, the synchronizing components pass through the sync separator 20 and drive the horizontal deflection and output circuits 24. As is well known, the sync separator 20 also provides a keying pulse to the chrominance portion of the video circuit 16 to enable the color synchronizing burst to be separated from the composite color television signal in order that it might be used to control the demodulation of the chrominance signal and thus derive the red, green and blue color difference signals.

The color kinescope 18 includes a deflection yoke 26 having terminals VV for the vertical and HH for the horizontal windings of the yoke. The vertical deflection windings VV are coupled to the output terminals WV of the vertical deflection circuits 22.

The horizontal deflection and output circuits 24 drive a horizontal output transformer 28 of the high power voltage supply 30. The terminals HH of the horizontal deflection windings derived line frequency scanning waves from output terminals HH of the horizontal output transformer 28 which is energized by a current supplied by the horizontal output tube in the horizontal output circuit 24. The horizontal output transformer 28 is of the auto-transformer type, the output of the horizontal output circuit being applied across a selected portion of the total series of windings and the horizontal deflection winding HH being effectively coupled across a small segment of this portion. A conventional damper tube 32 has its cathode connected to the high voltage transformer 28 and has its anode connected by way of an LC circuit 34 to a point of fixed reference potential. In this case, the point of fixed reference potential is that of the plate or B+ supply circuit 36. The lower portion of the high voltage transformer 28 includes a conventional B-Boost circuit 38 which returns the lower end of the horizontal output transformer 28 through a resistance voltage divider 40 to ground. The series voltage divider 40 includes a potentiometer 42, the arm of which provides a variable voltage related to the B-Boost voltage which may be employed as the picture control voltage for adjusting the level of the constant average kinescope beam current as will be described hereinafter. In this circuit the B-Boost voltage is a measure of the kinescope beam current flowing through the kinescope ultor electrode 44.

The high voltage for the ultor electrode 44 of the kinescope 18 is provided by high voltage rectifier 46 the anode of which is connected to the high potential terminal of the output transformer 30. The ultor supply electrode 44 is connected to the cathode of the high voltage rectifier 46..

Thus far described the circuit is that of a conventional television receiver. In accordance with the invention, a small amount of additional circuitry is added to the conventional receiver which reduces spot blooming and power supply overload. Basically, the invention includes two feedback loops, the first being a loop which maintains the average kinescope current constant. The second is a loop which acts to prevent the white peaks of the video from exceeding the level which causes spot blooming in the kinescope.

The latter of these loops, which may be termed the antiblooming loop, includes a simple high impedance diode circuit to sense the point at which spot blooming begins. The signal from this detector is amplified, rectified and then applied to the automatic gain control circuit of the receiver in such a manner as to turn down the overall set gain so as to reduce the amount of spot blooming. Proper choices of the anti-blooming circuit gain, time constant, and sensing point are made such that the net effect is to hold the brightest portion of a given scene just below spot blooming.

Specifically, the luminance signal from the output of the video circuit 16 is passed through a bandwidth limiting circuit 50 in order to prevent the blooming circuit from setting on narrow noise pulses extending into the white picture region. The white peaks of the luminance signal, thus bandwith limited, are then referred to a blooming reference voltage 52 by a blooming detection and amplification circuit 54. Only the peaks above this reference level are allowed to pass and be amplified. These amplified white peaks are peak detected and the resulting D.C. voltage is used to control the video gain of the video circuits 16. Specific circuitry for accomplishing this function is described in detail in FIGURE 2. With such system, the output video or luminance signal has its absolute amplitude controlled so that the white peaks are allowed to exceed the blooming reference level by approximately 1/ (loop gain) of the normal (open loop) amount.

The automatic brightness control loop uses the boosted B voltage from the high voltage power supply as an indication of the average kinescope current. When a predetermined kinescope current is thus sensed, beyond which the power supply would be overloaded resulting in the raster becoming defocussed, the D.C. bias of the video output stage is changed in the proper direction to reduce the kinescope current. This control operates in both directions in such manner that the bias on the kinescope (brightness) is altered to maintain constant average kinescope current. Because the kinescope average current remains constant, the ultor power supply "sees" a constant load thereby eliminating the need for the conventional shunt regulator to be in the power supply.

Specifically, the kinescope current controlling loop receives from the high voltage power supply 30 an electrical signal proportional to the amount of average kinescope current flowing. This signal as mentioned previously is derived from the arm of the potentiometer 42 which forms a portion of the series voltage divider 40 connected to the B-Boost circuit 38. If this electrical signal, which is proportional to the B-Boost voltage, varies from a predetermined setting thereby indicating a change in the average kinescope current an ultor current control circuit 56 operates to vary the bias on the kinescope (which controls brightness) to maintain constant average kinescope current.

In one form of the invention, the ultor current control circuit 56 uses vertical retrace pulses from the vertical deflection circuits 52 which are allowed to pass through a gate controlled by the B-Boost voltage in the varying amounts depending upon the value of the B-Boost voltage. These vertical retrace pulses are then amplified and detected to obtain the variable D.C. feedback signal which is used to control the bias of the video circuits 16, which in turn control the bias of kinescope 18. In another form of this invention, the ultor control circuit 56 may use horizontal retrace pulses.

From this description it may be demonstrated that the reproduced image would be somewhat dependent upon the picture content since a picture containing, for example, low peak whites causes the video gain to be increased due to the operation of the anti-blooming circuit. Because of the constant average kinescope current control, the brightness or background may be lowered to maintain the average kinescope current at a constant value. The viewer will have the impression that he is watching an A.-C. coupled receiver. But such receiver will have both freedom from overload and also freedom from blooming and at a reduced cost because of the omission of the relatively expensive shunt regulator tube.

Figure 2:
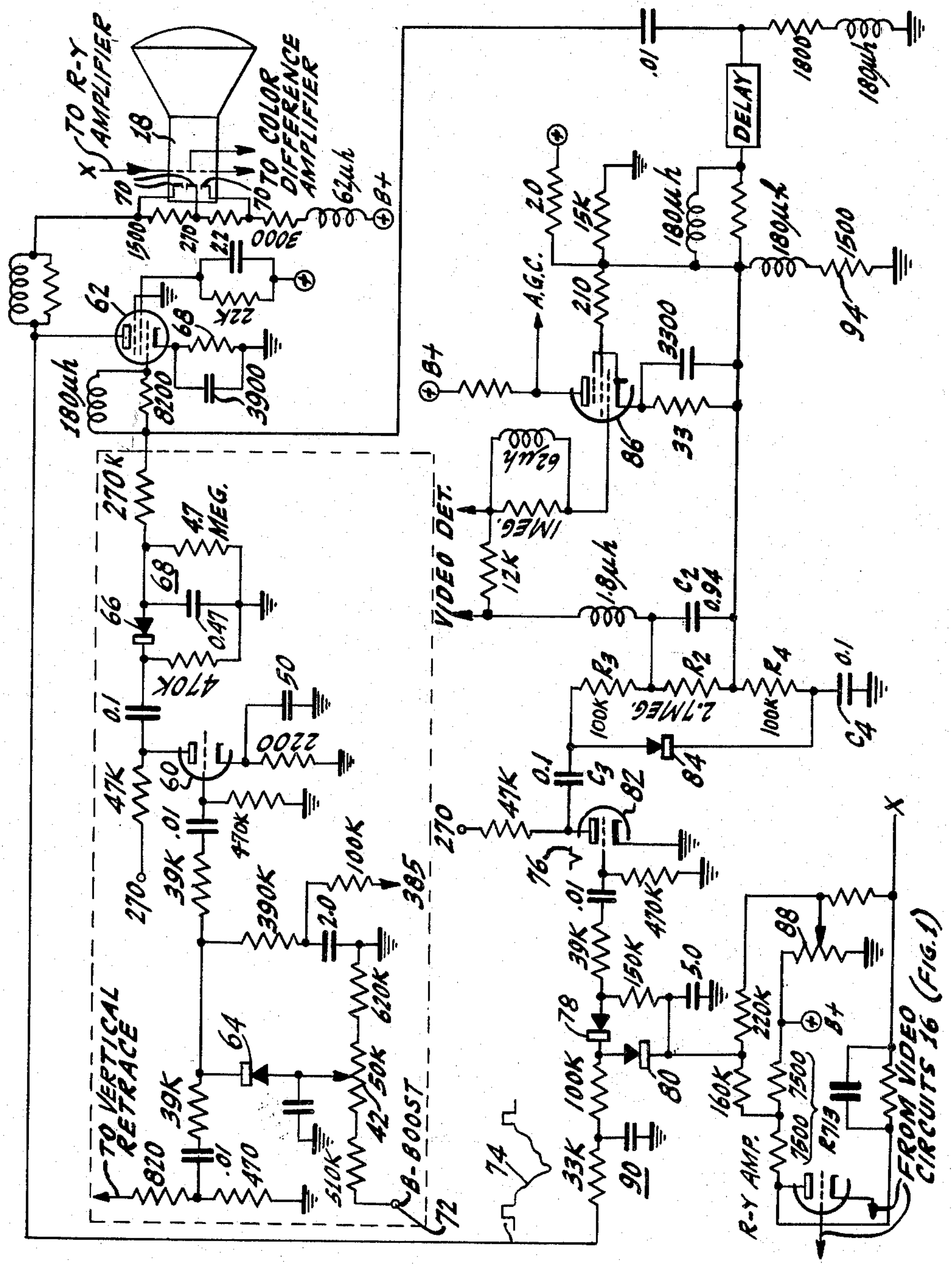
FIGURE 2 is a schematic diagram illustrating the details of the two feedback loops of FIGURE 1.

In FIGURE 2, the details of a conventional color television receiver circuit (here the RCA CTC7 referred to above), modified to accommodate the teachings of the subject invention, is illustrated. In this figure, only the two control loops are illustrated. The constant current loop begins with the circuitry in the upper left of the diagram. Varying amounts of the vertical retrace pulses from the vertical deflection circuits 22 (FIG. 1), are allowed to pass the diode 64 to be amplified by triode amplifier 60 and then peak detected by a second diode 66. The detected signal from the diode 66 is filtered by the RC combination 68 and then used to vary the bias on the control electrode of the second video amplifier 62. Since the second video amplifier 62 is D.C. coupled to the cathode electrodes 70 of the kinescope 18, the bias on the grid of the second video amplifier varies the bias on kinescope 18 which determines the average ultor current drawn by the kinescope thus completing the constant current loop.

The portion of the vertical retrace pulses that are allowed to pass the diode 64 is determined by the value of the B-Boost voltage applied to the terminal 72 which is derived from the B-Boost circuit 38 (FIG. 1). The variable potentiometer 42, which corresponds to that illustrated in FIG. 1, provides a "picture control" whereby the portion of the B-Boost voltage used to bias the diode 64 is varied. In this manner, depending upon the bias applied to the anode of the diode 64, varying amounts of the positive going vertical retrace pulses are allowed to pass to the triode amplifier 60.

In operation, as the B-Boost voltage drops from a more positive value to a less positive value thereby indicating an increased average kinescope current, the positive bias applied to the anode of the diode 64 decreases thereby allowing a larger portion of the vertical retrace pulses to pass to the triode amplifier 60. These increased amplitude pulses, after amplification, detection, and filtering increases the negative bias applied to the control grid of the second video amplifier 62. This in turn increases the plate voltage of the second video amplifier 62 thereby decreasing the average kinescope ultor current to maintain the average kinescope constant. A similar description of the operation can be given for the situation where the B-Boost voltage increases indicating a decrease in average kinescope current.

The anti-blooming circuit receives its input from the plate of the second video amplifier 62 in the form of a sync positive signal as indicated by the waveform 74. Simply stated, the anti-blooming circuit separates the white peaks 76, which would cause spot blooming, from the rest of the video signal 74 by means of two diodes 78 and 80. The separated white peaks 76 are amplified by triode 82 and peak detected by a diode 84 to provide a D.C. control signal. This control signal is coupled to the first video amplifier 86 and causes the AGC voltage derived from the plate of video amplifier 86, to decrease the overall set gain, thereby reducing the spot blooming.

The blooming sensing circuit just described has several unique features. To begin with, there must be a blooming reference voltage to which the peak white signals may be compared in order to ascertain the amount by which the video white peaks exceed the blooming level. Spot blooming may be determined, to a good approximation, with respect to the kinescope red guns' grid to cathode voltage. This red gun voltage is in the minus 25 to minus 50 volt range in a typical color television set of the CTC7 variety. Since the kinescope cathodes in the typical color television sets are about 250 volts above ground, if the red background voltage is altered by only 10% (about 25 volts) the blooming reference voltage, if a constant voltage is used, is altered by 50 to 100% as compared to the minus 25 to minus 50 volt grid to cathode blooming voltage. It is thus apparent that to have a desirable blooming control circuit operation the blooming reference voltage must track the red background voltage which may be changed in order to compensate for the tube aging, etc.

Thus, in accordance with this invention, the blooming reference voltage $V_R$ is obtained from the red background potentiometer 88. Thus, changes in the setting of the red background potentiometer 88 are reflected in the blooming voltage $V_R$ maintaining a constant blooming reference with respect to the red grid to cathode voltage. Stated in another manner, the blooming reference level is made to track the red background control. It may be noted in passing that prior to passing to the blooming detector, including the diodes 78 and 80, the video signal 74 is first passed through a low pass RC filter 90. This low pass filter limits the signal fed to the blooming detector to about 500 kilocycles and effectively reduces the effect of impulse noise.

The anti-blooming circuit illustrated in FIG. 2 also includes a novel method of altering the direct current appearing between the grid and cathode of the boot strapped first video amplifier 86. As will be recalled from the above description, since the gain of the I.F. stages of a television receiver is already controlled by an automatic gain control (AGC) system, in order to prevent spot blooming, a very low frequency (hence forth called D.C.) control signal is applied to the boot strapped first video amplifier. This first video amplifier provides D.C. gain to the control signal which alters the AGC voltage such as to increase or decrease the I.F. gain of the television receiver in the appropriate direction. However, inserting a D.C. control signal into a boot strapped video amplifier is an extremely difficult problem.

More specifically, the problem is to insert the D.C. control voltage, which is referred to grid-to-cathode of first video amplifier, without: (1) having the boot strapped amplifier cathode resistor attenuate the D.C. gain of the stage as in a cathode follower, (2) having the video output signal peak detected in the D.C. control circuit thereby causing erroneous D.C. control, (3) A.-C. shorting the boot-strapped cathode resistor, (4) A.-C. grounding the I.F. thus reducing the video gain to unity, (5) the D.C. from the boot strapped video biasing the diode in the control circuit.

The circuit illustrated in FIG. 2 overcomes these difficulties. Each of these difficulties are now considered in succession by describing the manner in which they are overcome by the illustrated circuit. The cathode resistor 94 of the boot strapped first video amplifier 86 does not effectively reduce its D.C. gain because the majority of the D.C. control from the diode 84 appears across the resistor $R_2$ which is coupled between the cathode and control electrode of the video amplifier 86. The second difficulty referred to above is alleviated since the video output signal cannot appear across the diode 84. The resistors $R_3$ and $R_4$ and capacitors $C_3$ and $C_4$ from a balanced network so that both terminals of the diode 84 are balanced with the same proportion of the video output signal. In this connection the capacitor $C_2$ bypasses the resistor $R_2$ for video frequencies to allow equal proportions of the video output signal to be applied equally to both terminals of diode 84. The third difficulty mentioned above is alleviated since the resistor $R_4$ is much greater than the cathode resistor 94. This means that the cathode resistor 94 is not A.-C. shorted to ground by the capacitor $C_4$. The fourth difficulty mentioned above is alleviated since the resistor $R_3$ is much greater than the cathode resistor 94 and also since the capacitor $C_2$ bypasses the resistor $R_2$ for video frequencies thus preventing the video from the I.F. amplifiers from being A.-C. grounded by the capacitor $C_3$. The fifth difficulty mentioned above is alleviated since the capacitors $C_3$ and $C_4$ prevent any D.C. biasing of the diode 84 by the boot strapped video stage.

Figure 3:
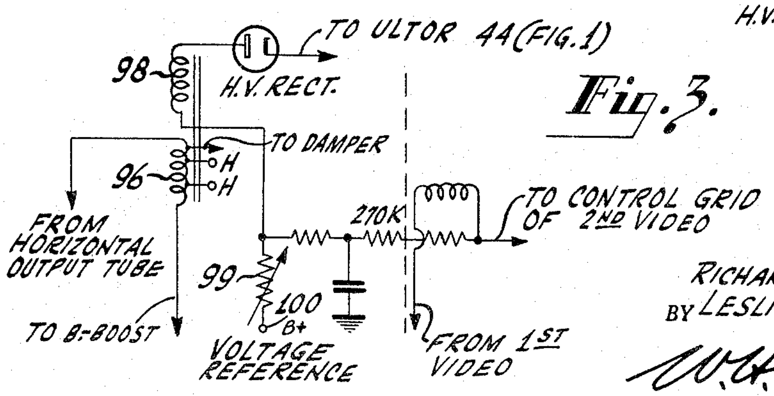
FIGURE 3 is a partial schematic diagram of an alternative circuit that may be use in place of that employed in FIGURE 2 to maintain constant average kinescope current.

In FIG. 3 there is illustrated an alternative arrangement which may be used in order to maintain constant average kinescope current in lieu of that circuit portion of FIG. 2 which is enclosed in the dotted rectangle. In accordance with the circuit of FIG. 3 a sample of the kinescope current is obtained and the voltage this current produces across resistor 99, is subtracted from a reference voltage 100. A filtered voltage proportional to the difference is then applied to the control grid of the second video amplifier 62 (FIG. 2) and fed to the cathode electrodes 70 (FIG. 2) of the guns of the color kinescope 18. In this manner, the average kinescope current is maintained at a constant value.

In FIG. 3, the horizontal output tube from the block 24 (FIG. 1) drives a high voltage and deflection transformer 96 which has an isolated high voltage winding 98. In this manner, the kinescope ultor current is caused to flow through a potentiometer 99 to a voltage reference point 100. The potentiometer 99 is variable and constitutes a picture control potentiometer. The voltage drop occurring across the potentiometer 99 subtracts from the voltage appearing at the voltage reference point 100 which, for example, may be B+, and the difference is applied to the grid of the second video amplifier 62 (FIG. 2).

As in the case of the circuit operation of FIG. 2 this difference output signal is applied to the cathode 70 (FIG. 2) of the color kinescope 18 (FIG. 2) thereby varying the kinescope current. This complete circuit forms a highly degenerative feedback loop which will reduce the deviation of the average kinescope current, due to a changing video signal, by 1/ loop gain. Because the gain of the second video amplifier, the loop gain is sufficiently high so that the average kinescope current may be considered a constant.

By way of example, to understand the circuit operation let it be assumed that the average kinescope current increases. This results in increased current flow through the potentiometer 99. The voltage from the grid to cathode of the second video amplifier 62 (FIG. 2) drops. With reduced voltage at its control grid, the plate of the second amplifier 62 (FIG. 2) increases in a positive direction thereby decreasing the kinescope current. By this technique the assumed increase in average kinescope current is nullified by the subsequent increase resulting from the feedback, thereby maintaining an essentially constant average kinescope current.

A novel and improved television system has been described which includes not only a feature for maintaining the average kinescope constant but also includes anti-blooming circuitry for preventing spot blooming from occurring due to peak whites in the video signal. This invention results in a relatively low cost circuit which eliminates the need for regulating the power supply voltage and also provides a circuit which is quite easy for the inexperienced viewer to operate under optimum viewing conditions. The circuits of this invention find utility in either monochrome or color television receivers and monitors.

What is claimed is:

1. In a cathode ray tube system including a cathode ray tube device having a beam intensity controlling means and an ultor electrode, a high voltage supply coupled to said ultor electrode and means for applying a video signal to said beam intensity controlling means, an automatic control system comprising means coupled to said video signal applying means for detecting picture information peaks in one direction of said video signal to produce a control signal, and means coupled to said video signal applying means and responsive to said control signal for controlling the amplitude of said video signal applied to said beam intensity controlling electrode as a function of the amplitude of said picture information peaks in said video signal whereby to prevent said cathode ray tube from spot blooming.

2. In a cathode ray tube system including a cathode ray tube device having a beam intensity controlling electrode, and means for applying a video signal to said beam intensity controlling means, an automatic contrast control system comprising means coupled to said video signal applying means for detecting peaks in one direction of said video signal, said detecting means including a low pass filter means for preventing noise peaks in said video signal from being detected, and means coupled to said video signal applying means for controlling the amplitude of said video signal applied to said beam intensity controlling means as a function of the amplitude of said peaks in said video signal whereby to prevent said cathode ray tube from spot blooming.

3. In a cathode ray tube system including a cathode ray tube device having a beam intensity controlling electrode and an ultor electrode, a high voltage supply coupled to said ultor electrode, and means for applying a video signal to said beam intensity controlling electrode, an automatic brightness and contrast control system comprising means coupled to said video signal applying means for detecting peaks in one direction of said video signal with respect to a reference voltage level, means for deriving said reference level from said beam intensity controlling electrode whereby said reference level is caused to track the operating point of said beam intensity controlling electrode, and means coupled to said video signal applying means for controlling the amplitude of said video signal applied to said beam intensity controlling electrode as a function of the amplitude of said peaks in said video signal whereby to prevent said cathode ray tube from spot blooming.

4. In a television system including a kinescope having a beam intensity controlling electrode and an ultor electrode, a high voltage supply coupled to said ultor electrode and means for applying a video signal to said beam intensity controlling electrode, an automatic brightness and contrast control system comprising means for sensing the average current passing to said ultor electrode from said high voltage supply, means coupled between said sensing means and said beam intensity controlling electrode for controlling the direct current level of said beam intensity controlling electrode inversely as a function of the current passing to said ultor electrode whereby to maintain the average ultor current constant, a source of a blooming reference voltage, means coupled to said video signal applying means and to said source of blooming reference voltage for detecting low frequency white peaks of said video signal to provide a blooming error signal, and automatic gain control means coupled to said video signal applying means and responsive to said blooming error signal for controlling the gain of said video signal applying means inversely as a function of said white peaks whereby to prevent said cathode ray tube from spot blooming and whereby said kinescope may be allowed to operate under conditions of maximum brightness and contrast.

5. In a color television signal receiving system, the combination comprising, an image reproducing device, signal translating means for processing a received signal to provide a video signal, means coupled to said video signal amplifier to detect white peaks appearing in said video signal, and automatic gain control means coupled between said detecting means and said signal translating means for controlling the gain of said signal translating means whereby to prevent the amplitude of said white peaks from exceeding the amplitude level that causes spot blooming in said image reproducing device.

6. In a color television signal receiving system, the combination comprising, a color kinescope having guns for generating at least one electron beam, signal translating means for processing a received signal to provide a video signal, a source of blooming reference potential proportional to the bias on one of said guns at which spot blooming occurs in said kinescope, gating means for comparing the white peaks of said video signal to said blooming reference potential for selectively passing only that portion of said white peaks that exceeds said blooming reference potential, means coupled to said gating means for peak detecting said white peaks that pass said gating means thereby to provide a D.C. control potential, and automatic gain control means being responsive to said D.C. control potential being coupled to said signal translating means for controlling the gain of said signal translating means for controlling the gain of said signal translating means inversely with respect to said white peaks thereby to prevent the amplitude of said white peaks from exceeding that amplitude that causes spot blooming in said kinescope and whereby said blooming reference potential tracks the operating characteristics of one of said guns.

7. The combination set forth in claim 6 which includes a low pass filter coupled between said gating means and said video amplifier thereby to prevent said automatic gain control means from operating in response to high frequency noise components that appear on said video signal.

References Cited by the Examiner

UNITED STATES PATENTS

| | | | |
|---|---|---|---|
| 2,414,228 | 1/47 | Gottier | 178—7 XR |
| 2,892,028 | 6/59 | Pritchard et al. | 178—7.3 |

DAVID G. REDINBAUGH, *Primary Examiner.*